United States Patent [19]
Taiana

[11] Patent Number: 5,841,090
[45] Date of Patent: Nov. 24, 1998

[54] METHOD AND APPARATUS FOR THE SEAM WELDING OF CONTAINERS

[75] Inventor: Peter Taiana, Stoffelbach, Switzerland

[73] Assignee: Elpatronic AG, Zurich, Switzerland

[21] Appl. No.: 688,724

[22] Filed: Jul. 31, 1996

[30] Foreign Application Priority Data

Sep. 4, 1995 [CH] Switzerland ............ 02-502/95

[51] Int. Cl.⁶ .................................................. B23K 1/16
[52] U.S. Cl. .......................................................... 219/64
[58] Field of Search ..................... 219/61.3, 61.4, 219/61.5, 63, 64, 81, 83, 84

[56] References Cited

U.S. PATENT DOCUMENTS

| | | | |
|---|---|---|---|
| 4,525,617 | 6/1985 | Saito ........................................ | 219/83 |
| 4,803,325 | 2/1989 | Frei et al. ................................ | 219/64 |
| 5,017,749 | 5/1991 | Boyd et al. .............................. | 219/64 |
| 5,089,682 | 2/1992 | Davies ..................................... | 219/84 |
| 5,122,629 | 6/1992 | Stieger .................................... | 219/64 |
| 5,155,405 | 10/1992 | D'Aniello et al. ..................... | 310/237 |
| 5,420,389 | 5/1995 | Davies .................................... | 219/84 |
| 5,550,345 | 8/1996 | Meier et al. ........................... | 219/121.63 |

FOREIGN PATENT DOCUMENTS

| | | |
|---|---|---|
| 0 278 098 A2 | 8/1988 | European Pat. Off. . |
| 0 503 292 A2 | 9/1992 | European Pat. Off. . |
| 0 565 846 A1 | 3/1993 | European Pat. Off. . |
| 0 692 334 A1 | 1/1996 | European Pat. Off. . |
| C 376 198 | 5/1923 | Germany . |
| 28 12 415 A1 | 10/1978 | Germany . |
| 36 07 272 A1 | 9/1986 | Germany . |
| 56-100 281 | 12/1979 | Japan . |
| 2173137 | 10/1986 | United Kingdom . |

*Primary Examiner*—Matthew V. Nguyen
*Attorney, Agent, or Firm*—McCormick, Paulding & Huber

[57] ABSTRACT

For butt welding or lap welding container bodies, each body is guided between an outer current-carrying electrode roller and an inner roller. According to the invention the inner roller is movably mounted and exerts an opposing pressure to the rigidly mounted outer roller. This results in improved weld quality.

14 Claims, 5 Drawing Sheets

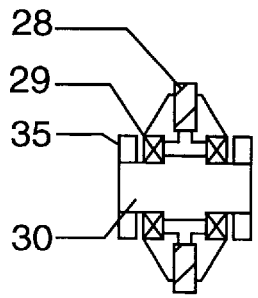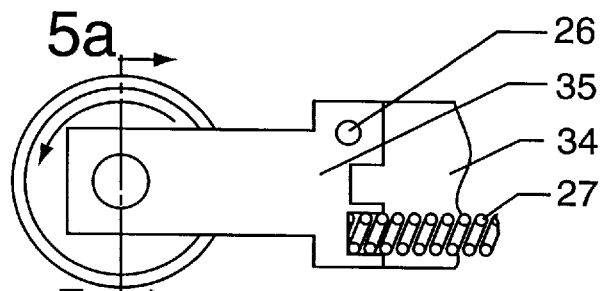
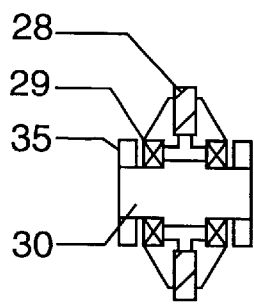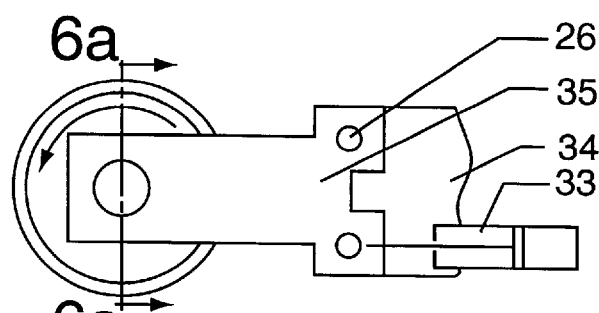
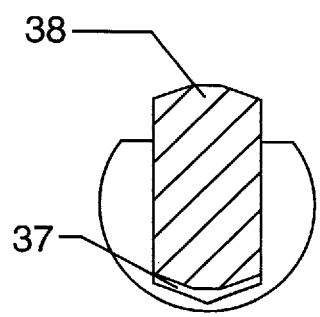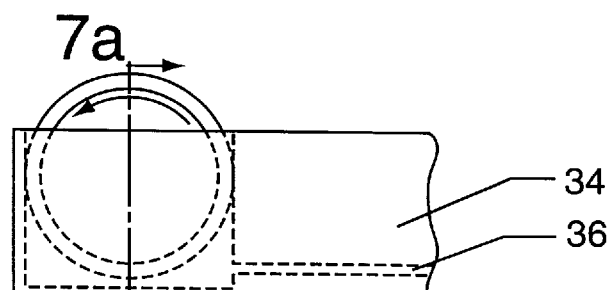

METHOD AND APPARATUS FOR THE SEAM WELDING OF CONTAINERS

BACKGROUND OF THE INVENTION

The invention relates to a method for the seam welding of container bodies of thin, preferably tinned, sheet metal. The invention also relates to an apparatus for carrying out the method.

"Thin" or "very thin" sheets are metal sheets with a thickness of approximately 0.1 to 0.5 mm. These may be tinned (so-called tinplate), or given other coatings, or may be uncoated (blackplate). Welding of containers especially of tinplate, and in particular can bodies, with an overlapping welded seam using a copper wire intermediate electrode is known. Until now this has proved to be the only technically and commercially successful method, as the coating of tin on the sheet causes severe contamination of the electrode, which in industrial use can only be overcome with the constantly self-renewing copper wire electrode.

Investigations have also been made into the possibility of roller seam welding an overlapping seam without wire, with tungsten or molybdenum welding rollers (Paul Schindele, Investigations into the welding behaviour of tungsten and molybdenum alloys in the resistance seam welding of electrolytically tinned very thin sheet, Thesis at Munich Institute of Science and Technology, 1983; summary published in "*neue verpackung*" May 1984). Such a technique has not found acceptance in practice.

In the production of welded steel tubes, it is a known process to weld without overlap, by means of roller seam welding. In this case, copper electrode rollers can be used, since no tinning is present. The steel tubes welded by this process have a minimum wall thickness of 0.4 mm, and a high force has to be exerted on the tube through pressure rollers at the sides of the seam (Deutscher Verband für Schweisstechnik e.V., Code of Practice DVS 2911). Steel tube welding technology has so far not provided any stimulus for the welding of cylindrical bodies of very thin tinned sheet (with a thickness of eg. approximately 0.19 mm), in which the conditions are essentially different and in which—by contrast with tube manufacture—no continuous seam is produced.

However, it has been found that it is also possible in principle to weld container bodies of thin sheet without overlap, although it is not easy to obtain a uniformly tight joint. Conventionally, when welding a lapped joint a spring mounted outer welding roller and a rigidly mounted inner welding roller are used. In the case of butt welding—which may be performed with or without an intermediate wire electrode—problems occur, resulting in a lack of sealing in the welded seam.

SUMMARY OF THE INVENTION

The object, therefore, is to provide a welding method and an apparatus which enable butt welding of container bodies to be performed with more consistent quality of weld.

According to the invention, this is achieved in a method of the abovementioned kind by welding the longitudinal margins of the bodies edges to edge, guiding the body between a current-carrying outer roller and a movably mounted, non-current-carrying inner roller, and pressing the inner roller against the outer roller with a predetermined force.

Surprisingly, it has been found that much better weld quality can be obtained in the case of butt welding if, instead of giving the outer welding roller a movable mounting—as in lap welding—the inner welding roller is movably mounted. The explanation for this surprising effect probably lies in the fact that butt welding is particularly sensitive to the forces which are produced by the rapid insertion of the moving body between the outer roller and the inner roller. As the inner roller is not current-carrying in the butt welding process, and can therefore be made with very low mass, the movable mounting of this roller brings about a particularly large reduction in these insertion forces. Although an expert would hitherto have considered it unnecessary, and undesirable in view of the small amount of space available, to provide a movable mounting for the inner roller inside the body, the present invention does adopt this course and thereby obtains improved weld quality.

The new method can also be used to advantage in the welding of a lapped seam. In particular, this can improve weld quality at the start of each welded seam.

The apparatus for carrying out the method is comprised of an outer welding roller with two electrodes and a movably mounted, non-current carrying inner roller pressed against the outer roller.

Making the inner roller of lightweight ceramic material is particularly preferred. One particular configuration has an inner roller made in two parts, providing a uniform contact pressure on either side of the butt joint. It is also preferable for the inner roller to be shaped as a sphere.

BRIEF DESCRIPTION OF THE DRAWINGS

Further particular ways of carrying out the invention will be described in detail with reference to the drawings, in which:

FIGS. 5*a* and 5*b* show a further embodiment in vertical section and in elevation;

FIGS. 6*a* and 6*b* show a further embodiment, in similar views;

FIGS. 7*a* and 7*b* show a pneumatically mounted roller in vertical section and in elevation;

DESCRIPTION OF THE PREFERRED EMBODIMENTS

Figure 1:
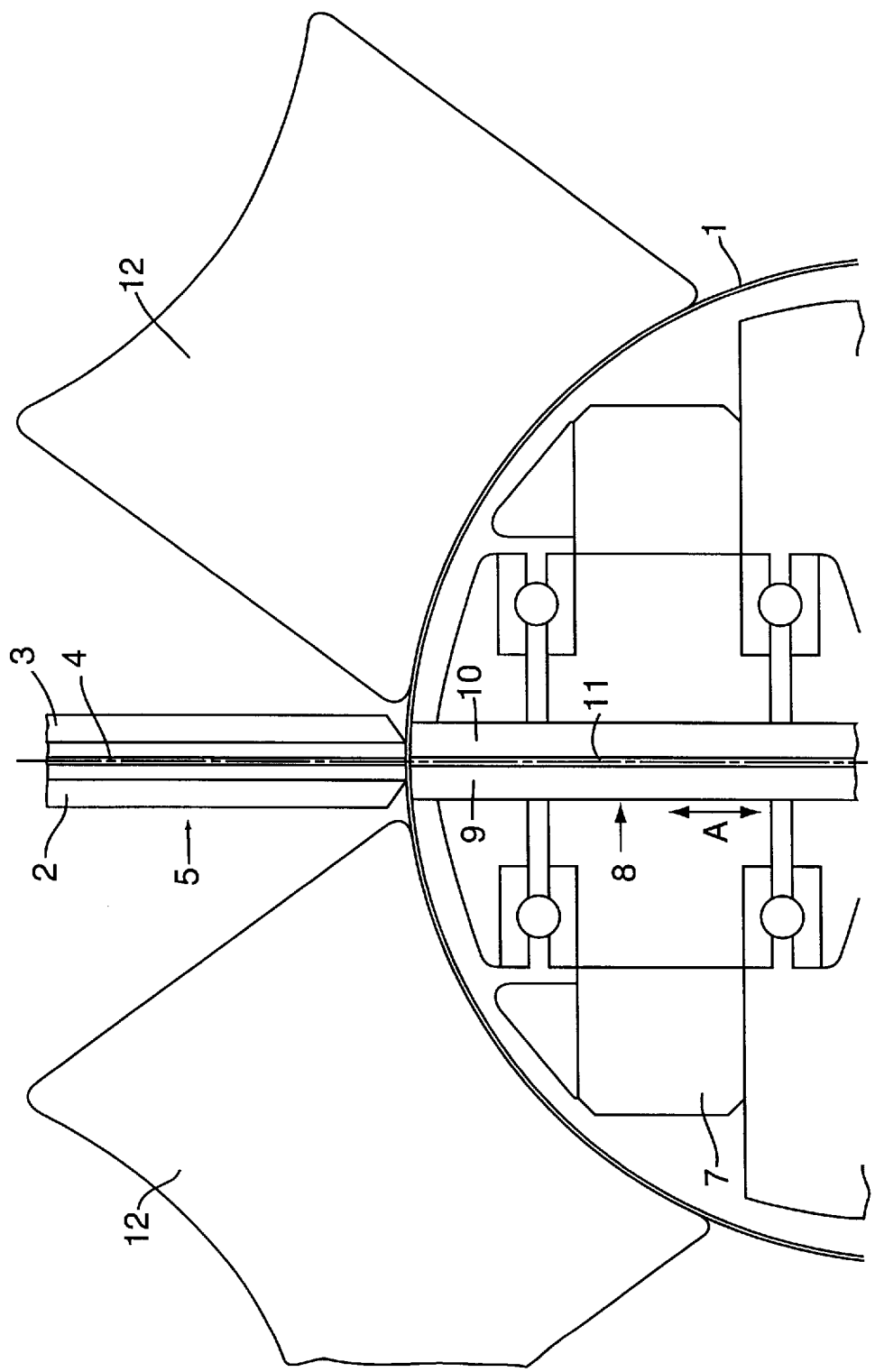
FIG. 1 is a schematic view of part of a can body in the course of the welding operation.

FIG. 1 shows schematically part of a can body 1 which is being butt welded by the roller seam welding process. This is performed by means of two electrodes 2 and 3 which are separated from one another by insulation 4, and form a welding roller 5 located outside the body. An inner roller 8 is rotatably mounted on a supporting arm 7 on the lower arm of the seam welding machine, inside the body 1. This roller 8 is not current-carrying. In the illustrated example the roller 8 comprises two disks 9 and 10 of a hard metallic material and an insulating centre layer 11. Furthermore, calibrating rollers 12 are arranged outside the body in a known manner, ensuring the roundness of the body. In addition to the calibrating rollers 12 shown in the drawing, other calibrating rollers, not visible in the drawing, are usually provided around the circumference of the body 1.

The body is guided between the welding roller 5 and the opposite roller 8 so that the edges of the body are butted together, without overlapping. This can be effected by suitable guide rails (so-called Z-rails), which are known in themselves from the forming of overlapping seams, and are therefore not described or illustrated here, but which are in this case set so that no overlapping occurs, and the two longitudinal margins of the body are pressed together edge to edge. This is achieved with an H-shaped rail. The guide rail may bring the edges of the body together so that they are level with each other but are still at a slight gap of eg. 0.1 mm from each other.

The inner roller 8 is movably mounted so that it is able to execute a movement in the vertical direction, as indicated in FIG. 1 by the arrow A, when the body 1 is pushed between the roller 8 and the roller 5. The roller 8 is urged towards the rigidly mounted roller 5 with an adjustable force, which may be applied eg. by a spring or by pneumatic means. The outer roller 5 is normally rigidly mounted in this arrangement, thus reversing the situation which applies in lap welding, where this roller would be spring-mounted. However, it is also possible in principle for the roller 5 to have a movable, sprung mounting, so that both rollers are movably mounted.

Figure 2:
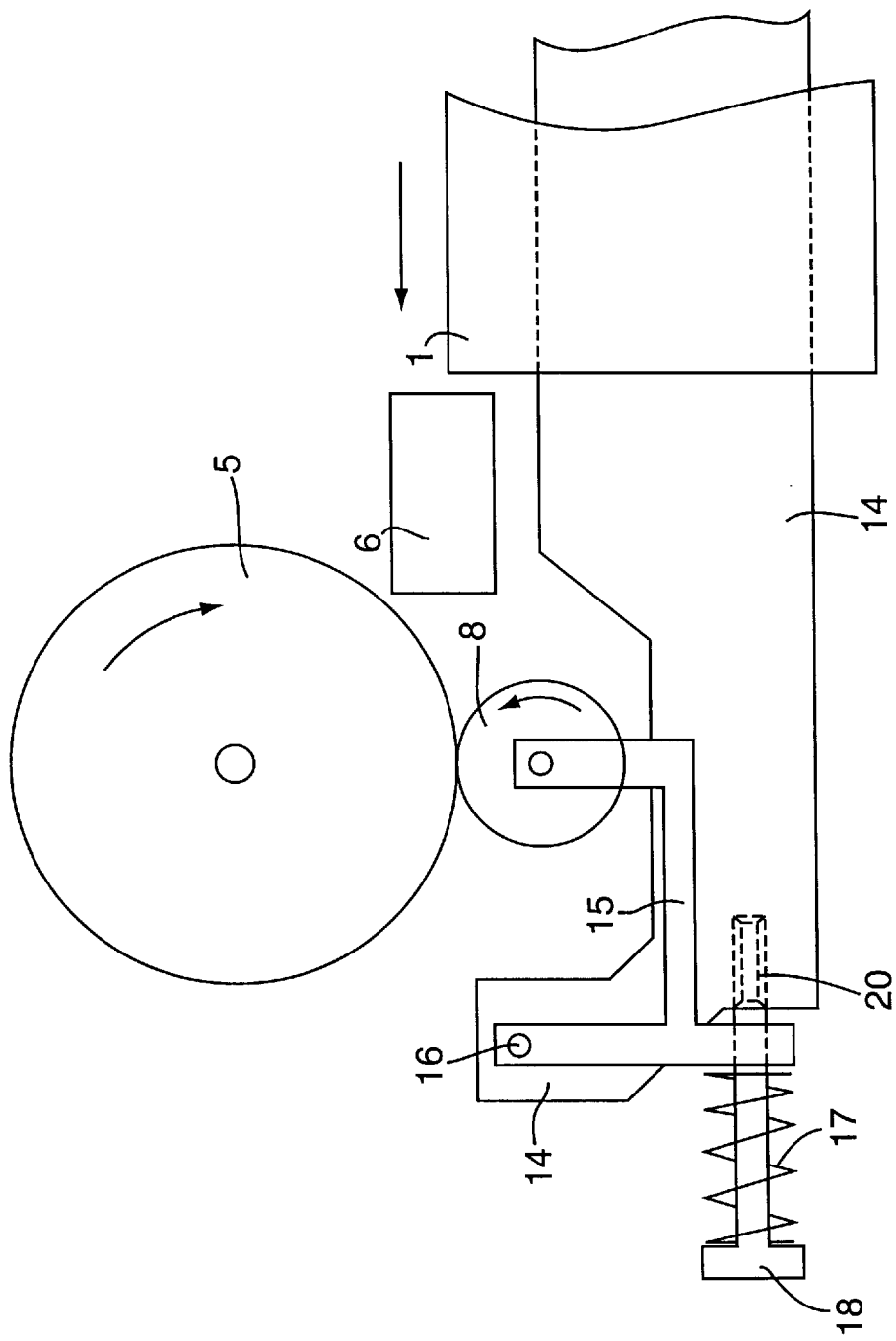
FIG. 2 is a schematic elevation of outer and inner welding rollers.

FIG. 2 shows in highly schematic form a first embodiment of the movable mounting of the inner roller 8. The outer roller 5 has a rotatable mounting which is fixed with respect to the machine; this mounting is not shown here. For the movable mounting of the roller 8, a rocker 15 is linked by a pivot 16 to the conventional lower arm 14 of the seam welding machine. The rocker 15 is therefore movable, and it carries the roller 8. To urge the roller 8 towards the roller 5 under spring loading, a compression spring 17 is provided, as shown in FIG. 2. This spring bears at one end on the rocker 15, and is acted on at its other end by the head of a screw 18 the other end of which has a screw thread 20 and is screwed into the lower arm 14. By varying the depth of insertion of the screw 18 into the lower arm 14, it is possible to adjust the spring force acting on the rocker 15 and hence on the inner roller 8 for the welding of the body 1.

Figure 3:
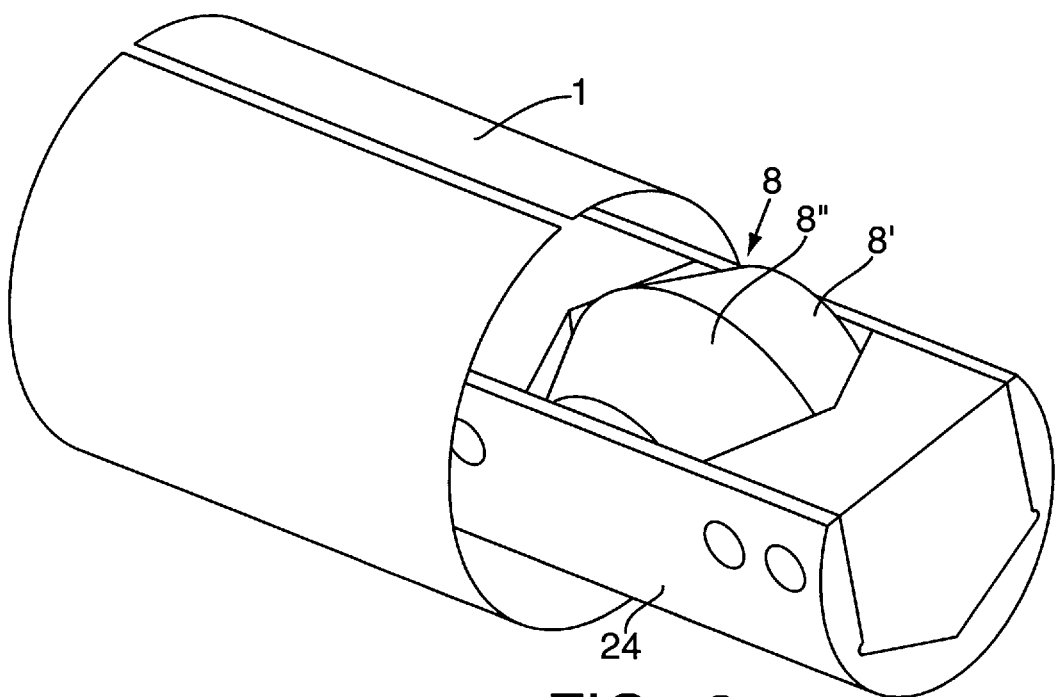
FIG. 3 is a perspective view of another embodiment of the inner roller.

FIG. 3 shows another embodiment in a perspective view. In this case only the lower arm 24 is shown, with the inner roller 8, which consists of two parts 8' and 8". In this example the movable mounting and springing of the roller are obtained pneumatically by the provision of a chamber, supplied with compressed air at a pressure of eg. 6 bar, under the two roller halves 8' and 8". The two roller halves are able to move independently of one another. The force exerted by the inner roller 8 can be adjusted by varying the air pressure. The air pressure may be varied while the seam welding machine is in operation, and may eg. be lower at the start (and if need be at the end) of each body than in the remainder of the body 1. This provides a means of controlling the pressure of the inner roller 8 to adapt the force which it opposes to the outer roller to the changing conditions during welding. Control may of course also be electrical or electromagnetic, in which case an arrangement similar to that of FIG. 2 may be used, the force of the spring being varied eg. by the force of an electrical actuator or of an electromagnet, or the spring itself being replaced with an electrical actuator or electromagnet. In this way, a constant force opposing the current-carrying outer roller can be produced. This force control also makes it possible to reduce wear in no-load running (during run-up without can bodies) by reducing the pressure of the inner roller.

Figure 4:
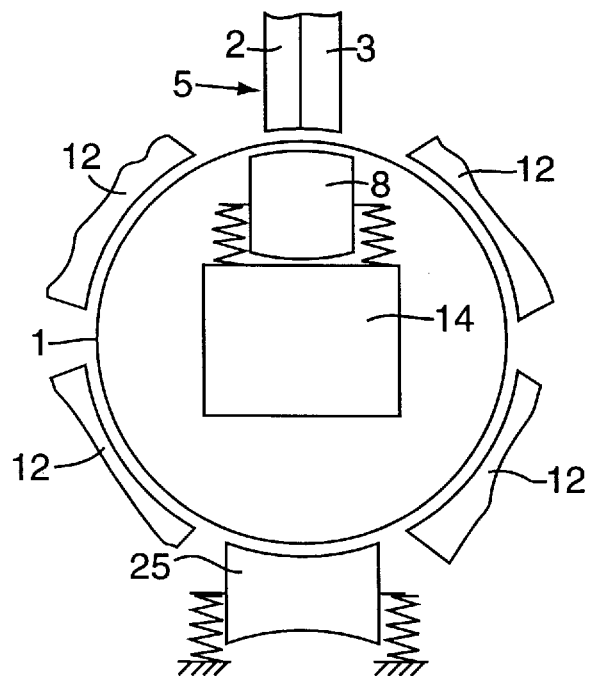
FIG. 4 is a schematic front view of a further embodiment.

FIG. 4 shows a further embodiment, in which the same reference symbols have been used to refer to the same parts as before. FIG. 4 shows, in highly schematic form, that a pressure roller 25 can additionally be provided outside the body 1, opposite the rollers 5 and 8. This roller 25 is spring-mounted, and its spring force assures a symmetrical loading of the butt joint.

FIGS. 5a and 5b show the inner roller arrangement in a further embodiment, viewed in elevation and in section along the line 5b—5b, respectively. A rocker 35, which is acted on by the compression spring 27, is mounted on the arm 34 so that it is movable about the pivot 26. The rocker 35 carries the shaft 30, on which are mounted bearings 29 and the inner roller 28 which opposes the welding roller 5.

FIGS. 6a and 6b show in a similar way to FIGS. 5a and 5b, a further embodiment with the same reference symbols denoting the same parts. The spring force is exerted by a pneumatic cylinder arrangement 33.

FIGS. 7a and 7b show a pneumatically sprung inner roller 38 to oppose the welding roller 5, with a compressed air feed 36, which forms a cushion 37 of compressed air under the roller 38, provided on the arm 34.

Figure 8A:
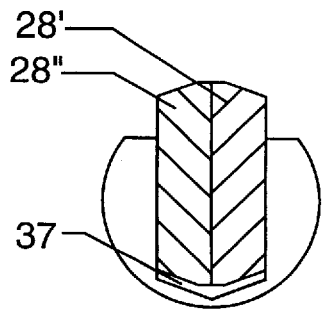
FIGS. 8*a* and 8*b* show a two-part roller, in similar views.
Figure 8B:
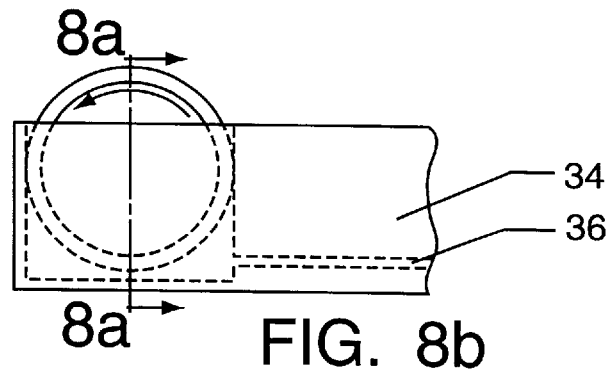

FIGS. 8a and 8b show another embodiment similar to that of FIGS. 7a, 7b, provided with an inner roller which is in two parts 28' and 28".

Figure 9A:
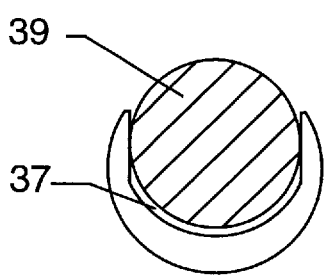
FIGS. 9*a* and 9*b* show an embodiment with a spherical roller, in vertical section and in elevation.
Figure 9B:
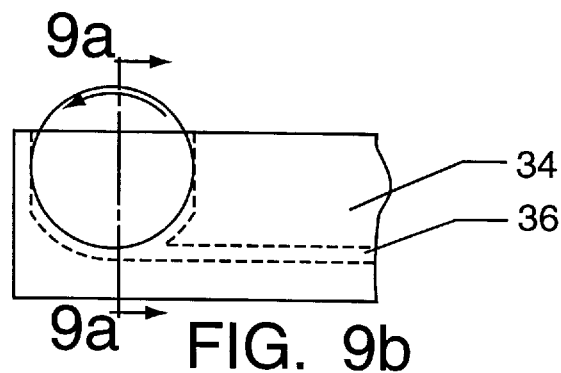
Figure 10A:
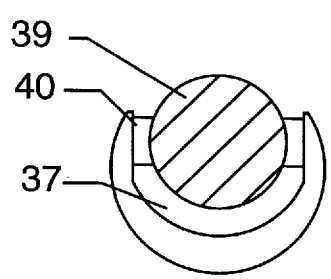
FIGS. 10*a* and 10*b* show a further embodiment with spherical roller, in similar views.
Figure 10B:
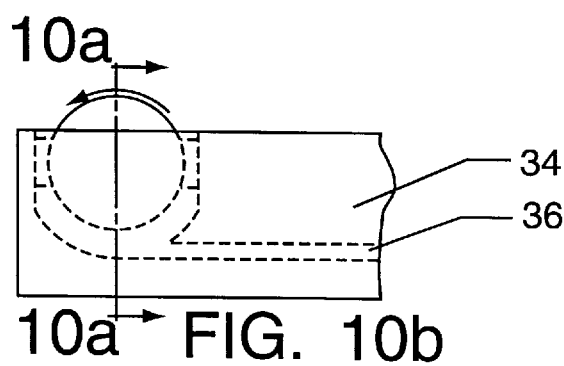

FIGS. 9a and 9b show an embodiment with a pneumatically sprung spherical inner roller 39 for opposing the welding roller 5. This embodiment results in less wear of the inner roller. The embodiment shown in FIGS. 10a,10b additionally has a slip ring 40 for the ball 39.

The embodiments shown may also be used for welding an overlapping seam, with the inner roller functioning as a current-carrying welding roller, with intermediate wire electrode, in a known manner.

I claim:

1. A method of seam welding of a container body formed from a thin sheet of metal, comprising the steps of:

guiding the container body between a movable non-conductive inner roller and a conductive outer roller having first and second electrodes such that first and second container body longitudinal edges are in non-overlapping, edge-to-edge relationship to define a container seam for welding by the first and second electrodes of the outer roller;

urging the inner roller toward the outer roller with a selected pressure; and passing a welding current between the first and second electrodes of the outer roller to weld the container seam.

2. The method according to claim 1 wherein the inner roller is adapted for being urged toward the outer roller with an adjustable pressure, and wherein the step of urging includes pressing the inner roller towards outer roller with a constant pressure during the welding of the seam.

3. The method according to claim 1 wherein the inner roller is adapted for being urged toward the outer roller with an adjustable pressure, and wherein the step of urging includes varying the pressure during the welding of the seam.

4. The method according to claim 1 further including the step of providing an external force on the container body opposite the rollers and directed towards the rollers.

5. An apparatus for the seam welding of container bodies formed from a thin sheet, the apparatus characterized by a current-carrying outer welding roller having first and second electrodes electrically separated from one another and a movably mounted non-current carrying inner roller, guide means engaging longitudinal edges of the container body to be welded together and guiding the edges between the rollers with the edges in a non-overlapping, edge-to-edge relationship for defining a seam to be welded by said outer welding roller, and force generating means coupled to the non-current carrying inner roller for urging the inner roller towards the outer roller under pressure.

6. The apparatus according to claim 5 characterised in that the force generating means includes an adjustable spring whereby the inner roller can be pressed by the spring with selectable force towards the outer roller.

7. The apparatus according to claim 6 characterised in that the apparatus includes a lower arm and the inner roller is mounted on the lower arm by means of the force generating means including a sprung rocker pivotably mounted on the lower arm.

8. The apparatus according to claim 5 characterised in that the force generating means is a pneumatic means, and the inner roller is mounted in the apparatus by the pneumatic means to be urged toward the outer roller pneumatically.

9. The apparatus according to claim 5 characterized in that the force generating means has a controllable or adjustable actuating element by means of which the pressure applied by the inner roller can be varied.

10. Apparatus according to claim 5, characterised in that the inner roller is formed from ceramic material.

11. Apparatus according to claim 5, characterised in that the inner roller consists of two parts mounted independently of one another.

12. Apparatus according to claim 5, characterised in that the inner roller is spherical.

13. Apparatus according to claim 5, characterised in that the outer roller is rigidly mounted.

14. The apparatus according to claim 5, characterised in that a spring-mounted pressure roller is provided at a side of a container against the side of the container body opposite from the inner and outer rollers.

* * * * *